Nov. 25, 1969 J. L. EISENBIES 3,480,915

DATA TRANSMISSION APPARATUS

Filed Jan. 30, 1967 2 Sheets-Sheet 1

INVENTOR
JOHN L. EISENBIES

BY William H. Barrett
ATTORNEY

Nov. 25, 1969 J. L. EISENBIES 3,480,915

DATA TRANSMISSION APPARATUS

Filed Jan. 30, 1967 2 Sheets-Sheet 2

United States Patent Office
3,480,915
Patented Nov. 25, 1969

3,480,915
DATA TRANSMISSION APPARATUS

John L. Eisenbies, Raleigh, N.C., assignor to International Business Machines Corporation, Armonk, N.Y., a corporation of New York Filed Jan. 30, 1967, Ser. No. 612,454
Int. Cl. G11b *13/00;* G06f *1/00, 7/00*
U.S. Cl. 340—172.5 2 Claims

ABSTRACT OF THE DISCLOSURE

A transmitter and receiver transfers data characters which may include numeric, alphabetics and special by utilization of permutations of signals each referrable to a character. In accordance with the number of bits available ($n$) for a data character and the coding system used, is determined the maximum number of different characters available which is the data set: $2^n$. To transfer binary data or data in another code set, the transmitter transmits a sequence of special characters to control the receiver to surpress normal interpretation of characters and interpret all characters as binary data. To transfer from this mode of data transmission to the regular code set, a second sequence comprising two special characters is transmitted. To prevent random binary data containing the required two character sequence from switching the mode of transmission erroneously, the transmitter recognizes the first character of the two character sequence whenever it occurs in the binary data and transmits immediately following another character identical to the first character. Control apparatus in the receiver responsive to the first character of the two character set is reset by the second character when it is the same as the first character—only one of the pair is treated as binary data by the receiver; the other one is discarded.

BACKGROUND OF THE INVENTION

Figure 1A:
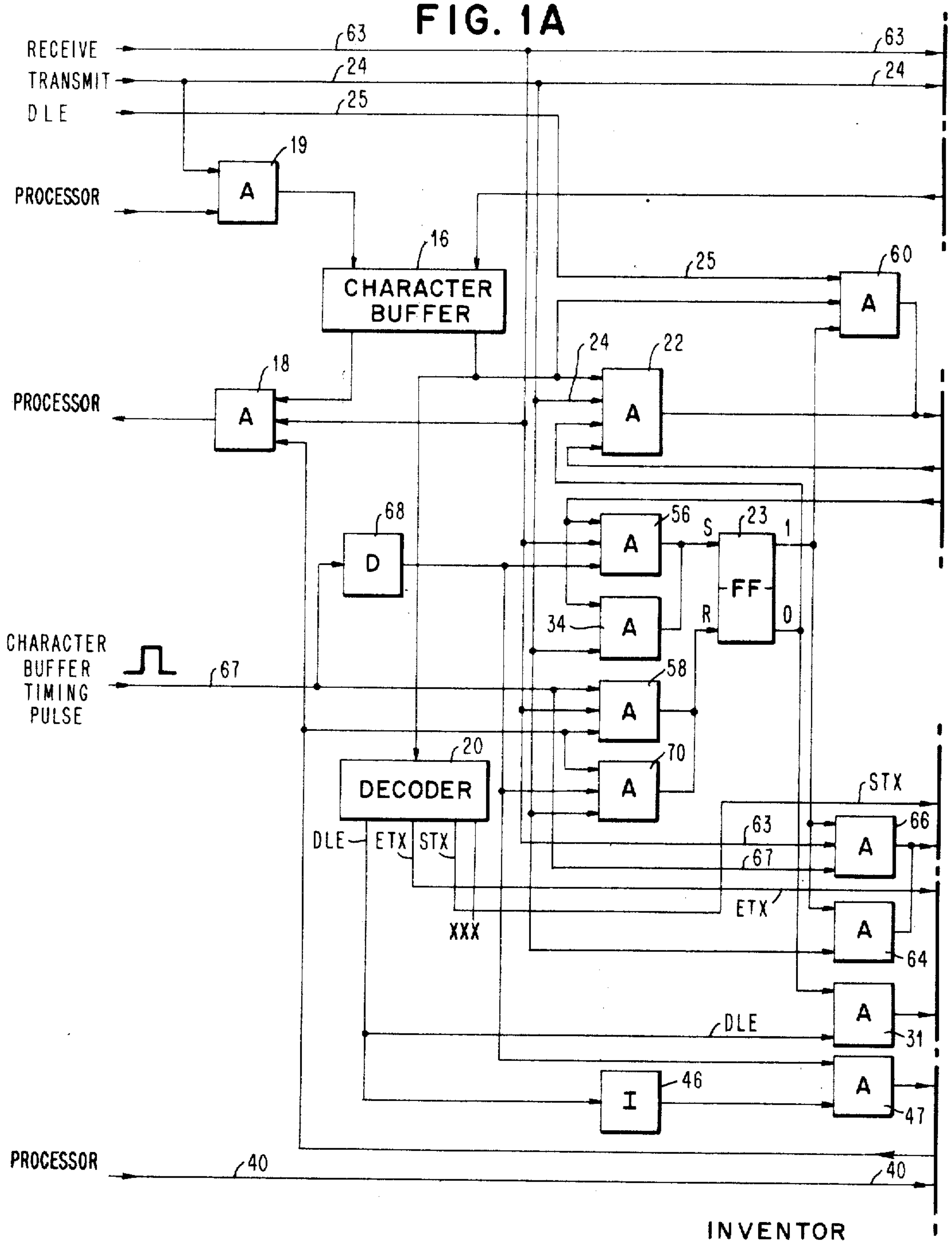

The invention is directed to the field of data transmission. In the transfer of data between units a system of coding is used so that the electrical signals transferred may be treated in accordance with this prearranged significance.

Thus betwen a data processor and a peripheral unit a system of coding would be used compatible with the functions expected of the peripheral unit. If the peripheral unit is a printer, the code set must include designations for alphabetic, numeric and special characters. Some of these special characters might, for example, indicate control functions to be performed on the printer such as carriage return.

Between other units there may be no need for the designation of alphabetic or special characters. This is particularly the problem insofar as the transmission of data between data processors is concerned where the data is predominately numeric; especially binary data. At the present time there are character sets such as EBCDIC (Extended Binary Coded Decimal Interchange Code) which can be used in data transmission. The characters are made up of eight bits so that there are (in binary format) a possible total of 256 characters ($2^8$). The character set includes, besides the alphabetic and numeric, special characters such as SYN (synchronizing character) STX (start of text), ETX (end of text), EOT (end of transmission), etc., which control certain functions in the receiver related to data communication.

If the data to be transferred is all decimal numeric there will be a 50% loss in the available data transmission rate, considering that with an eight bit code set, decimal numeric digits require only four of these eight bit positions. To avoid this loss in transmission ability, it is possible to utilize a so called transparent mode of data transmission which is defined to mean data characters without the usual character significance. In this manner, so called packed decimal (two decimal digits per eight bit byte) can be transferred where one EBCDIC character was previously transmitted.

Since the receiver is set to recognize the predetermined code set, it is necessary preparatory to the transmission of transparent data to transmit control signals to set the receiver to disregard its previously defined response to the various characters of the set and receive every character as numeric.

One method which has been used to designate whether data is transparent is to utilize a control bit to accompany each eight bit byte. Utilization of the ninth bit however effectively reduces the data transmission rate by ⅑ or 11%.

The present invention avoids this reduction in data rate by designating transparent data by a two character sequence which is recognized by the receiver which responds thereafter to the received data as if the same were all numeric. When the transmitter has completed the data transmission and wishes to return the receiver to the conventional operation it transmits another two character sequence. The sequences may be, for example DLE–STX to start transparency and DLE ETX to terminate transparency. Each of these characters has an EBCDIC code representation which is DLE 00001000, STX 01000000, EXT 11000000.

While this solves the initial problem of changing modes of data transmission, the two character sequence which is used for terminating transparency is obviously a valid sequence of binary numbers and is also the packed decimal representation of 1003. To avoid erroneous transmission, it is necessary to eliminate the control function from being initiated prematurely.

The possibility of erroneous transmission is eliminated by incorporating with the transmitter and receiver, apparatus responsive to the first character of any two character set that terminates transparency or is otherwise involved in controlling the devices operating on the communication line. That is, responsive to "DLE" which prevents the control sequence DLE ETX, for example, from resetting the receiver prematurely in a transparent mode of operation. This apparatus makes use of the DLE control function already incorporated into the receiver for recognizing valid sequences of control characters for eliminating that function.

In recognizing that the DLE character initiates a control sequence and a following character completes the sequence, it is also apparent that the DLE character is always significant and that just as the control sequence is initiated by DLE another DLE following immediately thereafter can be used to initiate a control sequence to reset the immediately preceding sequence without serious derogation of the data rate (one part in 256—0.2%—on the average in random binary data with 8 bits per character).

The transmitter monitors the data transmission and when, in transparency, a DLE character is detected, a second DLE character is inserted and transmitted as the next character, after which the transparent transmission is allowed to continue in the normal fashion. The receiver accepts one as data and discards the other after resetting the control sequence.

Apparatus such as shown in Patent 3,226,676 suggest the transmission of data containing cancel control patterns by recognizing an unwanted pattern, stopping transmission, introducing a cancel signal and then transmitting a correction signal. Also suggested is the introduction of an error signal which initiates a cancel signal and then correction.

It is therefore an object of the present invention to provide transmitter and receiver apparatus capable of transferring data in several codes by transmission of a control character sequence which initiates the code change where said control character sequences may be transferred as data without initiating a code change.

The foregoing and other objects, features and advantages of the invention will be apparent from the following more particular description of a preferred embodiment of the invention, as illustrated in the accompanying drawings.

Figure 1B:
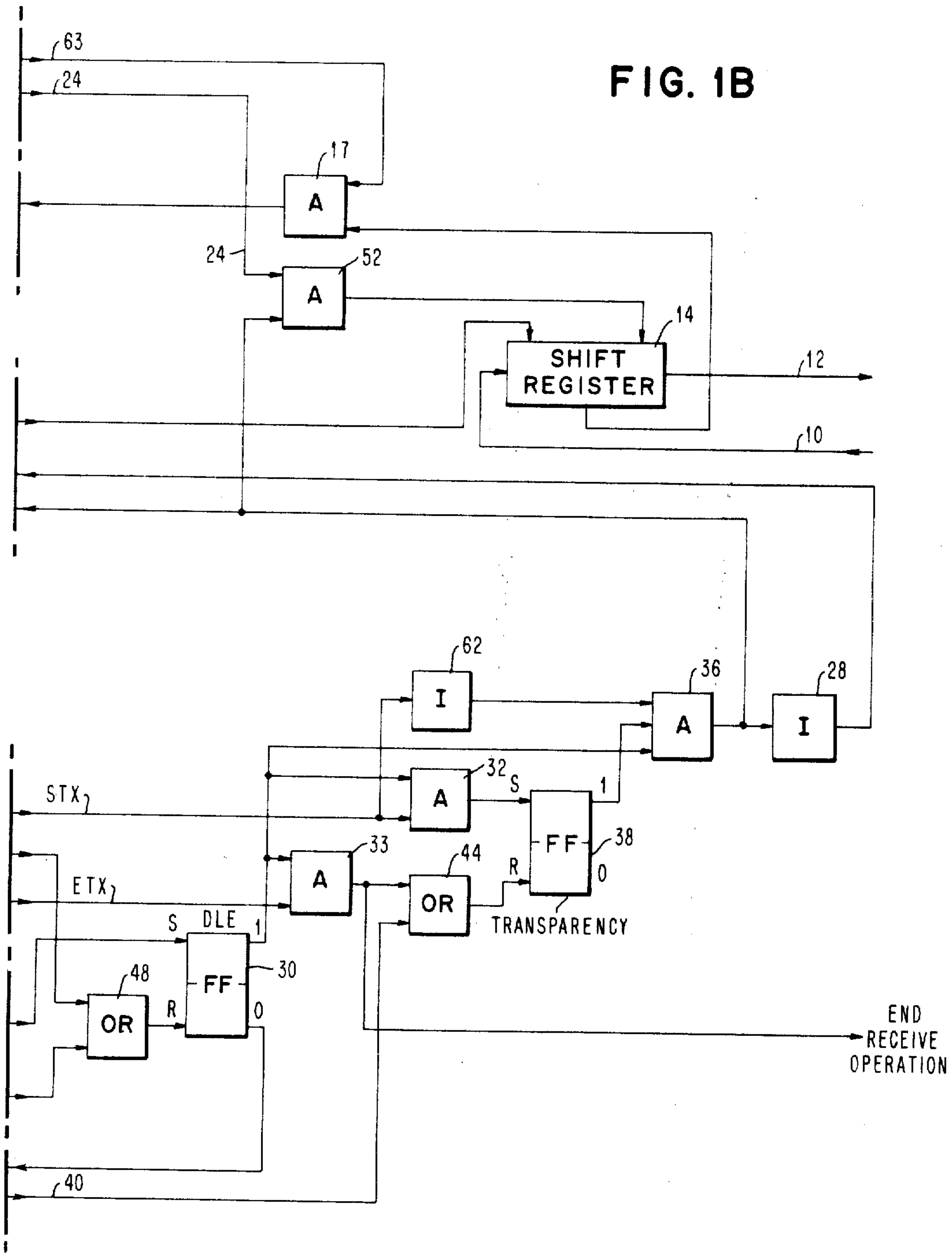

In the drawings:

FIGS. 1A and 1B are a schematic illustration of the control apparatus found at the transmitter and receiver.

Data by bit (in this embodiment) is received from a line 10 or transferred to a line 12 by a shift register 14. The shift register receives these bits and accumulates the same to form a complete character. Between the shift register 14 and buffer 16 the transfer of data is parallel by bit. Lines 10 and 12 are connected to a transmission line, not shown. The shift register 14 and its accompanying logic is not shown or described specifically since this is a conventional portion of data transmission and receiving apparatus.

From register 14, data by character, is transferred through AND circuit 17, enabled by a control signal indicative of the fact that the apparatus is receiving data to a character buffer 16 and through an AND gate 18 to a processor (not shown). In the description of data flow lines it will be understood that there are a plurality of these lines in sufficient number to handle all data bits in parallel and that logic blocks are included to control these lines as designated by the single logic units shown.

Data received by buffer 16 is decoded at 20 to recognize the three characters shown (DLE, ETX, STX). Obviously there are many others involved in an actual transmission apparatus (as indicated by the output XXX).

The transmission of data from the processor (not shown) is through AND circuit 19 into buffer 16. They are transferred thereafter through an AND circuit 22 which is enabled by a transmit control line 24, the output of inverter 28 and the "0" output of a latch 23. From AND circuit 22, data is transferred to shift register 14 for transmission by means of output 12.

In the description of this apparatus, it should be specifically understood that the apparatus is greatly simplified. In this regard, it should be appreciated that the decoder 20 which recognizes the four code patterns shown, recognizes many others and provides outputs to many other circuits for initiating its own control function outside of the transparency operations.

It is also believed to be readily apparent that the physical makeup of the particular units shown is not of any particular significance but is predominately a question of the environment in which the invention is incorporated. For purpose of description, these have been shown in elemental and unitary form.

Assuming the apparatus of the figures are functioning in the normal transmit mode, the transmit line 24 is energized and data by character transferred from processor to buffer 16 as previously explained.

If a DLE character is detected and the output of latch 23 is "0," a latch 30 (*i.e.* bistable device) is set through an AND circuit 31. The output of DLE latch 30 is provided to an AND circuit 32 and 33. If immediately thereafter, a character STX is detected, AND circuit 32 is enabled to set a transparency latch 38. To reset the transparency latch, an input from the processor at 40 if the apparatus shown is transmitting or an output from an AND circuit 33 to be subsequently described is coupled through an OR circuit 44 to the reset side of latch 38.

The character following this first DLE which is not a DLE will reset latch 30. The output of decoder 20 is coupled through inverter 46 to AND 47 and OR circuit 48 to latch 30.

Assuming that the transparency latch 38 is set, a DLE character from the processor sets the DLE latch (as explained previously) to provide an output to AND 36. The output of AND 36 to inverter 28 disables AND 22 to prevent transfer of the DLE character in buffer 16. The output of AND 36 enables AND circuit 52 which provides an output to shift register 14 to cause the generation of a DLE character for transmission and also enables AND 34 and sets the latch 23.

The "1" output of latch 23 is coupled through AND 64, OR 48 to reset DLE latch 30. The "0" output of latch 23 (now down) disables AND 31 to insure that DLE latch 30 is reset by the DLE character still in the buffer.

The line 25 provides a pulse in response to the transmission of the DLE character by register 14. AND 60 is enabled and the DLE character is gated into the shift register.

The character buffer 16 after transfer of the character to register 14 initiates the transfer of data from the processor through gate 19 by suitable control.

Immediately after the character is received in buffer 16, a pulse is generated on line 67. The initiation of a pulse on line 67 is in response to the entry of the character into buffer 16. Since the logic is conventional, there is believed to be no necessity for a detailed showing of the logic. The pulse is also fed through delay 68 and enables AND 70 to reset latch 23; latch 30 was previously reset, "0" output on, and a signal on transmit line 24.

When the processor completes the transfer of transparent data characters into the character buffer 16 and immediately before transferring the DLE ETX sequence which is the control sequence for signaling termination of transparent data to the receiver, the processor provides a pulse on line 40 through OR 44 to reset transparency latch 38, thus the DLE ETX sequence can be transmitted without introducing an additional DLE character.

The preceding sequence of operation took place in the transmitter apparatus. The receiver responds in the following manner.

When the apparatus of the figures are acting as a receiver, there is a signal on line 63 enabling AND 16 so that data received in the shift register can be transferred to buffer 16.

Immediately after the character has been set into 16, the buffer 16 initiates the generation of a pulse on line 67 as explained previously.

Assuming everything is initially reset, the control DLE STX from the transmitter sets the transparency latch in the same sequence as the latch was set in the transmitter. Thus transparency latch 38 will be ON.

Suppose the transmitter sends a data DLE sequence which is received in the buffer 16. The first DLE in the sequence when decoded by 20 sets latch 30. With latch 30 set, the "0" output inhibits AND 18 to prevent the transfer of the DLE character received.

The output of 30 also conditions AND 36 to provide an output to AND 56 to condition the same. However, this AND is enabled by the output from delay 68 which it will be recalled occurred subsequent to the receipt of the character in buffer 16.

When the delay pulse occurs; latch 23 is set by the output of AND 56. When latch 23 is set it enables AND 66 and disables through the "0" output, AND 31 preventing the latch 30 from being set while latch 23 is set.

When the second DLE is received in shift register 14, it is transferred into buffer 16. When the next character pulse appears on line 67, the AND 66 is enabled which through OR 48 resets latch 30. The "0" output of latch 30 goes up enabling 18 to allow the DLE character to be transferred to the processor.

Note that while the next character pulse conditions

AND 58; the fact that DLE latch 30 is off prevented latch 23 from being reset. This prevents the second DLE character in the sequence in buffer 16 from setting the DLE latch 30 at this time.

The next character pulse on line 67 with the following character will set latch 23 through AND 58 thus enabling the setting of the DLE latch 30 if the next character is a DLE.

When the transmitter is terminating data transmission it transmits DLE ETX. The receiver when receiving the DLE sets the DLE latch 30 and the transfer of this character inhibited as described previously.

The output of 30 conditions AND 33. When ETX character is received and passed on to buffer 16 and decoded by 20 it enables AND 33 to reset transparency latch 38.

It is apparent other control sequences DLE XXX can be used for appropriate purposes without resetting the transparency latch. At this transmitter it is necessary to insert this control character directly in the shift register without duplicating the DLE character.

While the invention has been particularly shown and described with reference to a preferred embodiment thereof, it will be understood by those skilled in the art that various changes in form and details may be made therein without departing from the spirit and scope of the invention.

What is claimed is:

1. In a transmitter-receiver for a data transmission system wherein each datum is designated by a plurality of signals normally referrable to preselected characters or functions wherein it is desirable to transmit signal data without reference to said preselected characters or functions and to control the mode of transmission by initiation of a data character sequence while avoiding premature mode changing control functions initiated by random patterns of transparent data:

(a) means responsive to preselected characters to provide an output indicative thereof, (b) a multistate transparency storage device responsive to the detection by said decoding means of a preselected sequence of characters to be set to a state indicative of transparency, (c) character generating means in said transmitter responsive to the detection of a first character in said preselected sequence of characters by said transmitter when set in said transparency mode for transmitting said identical character as a portion of said data stream and contiguous to said detected character, (d) means contained in said receiver responsive to the detection of a first character in said preselected sequence of characters for assuming a first state, (e) means contained in said receiver responsive to the detection of another character identical to the first character in said sequence of character for resetting said means (d) above, (f) means contained in said receiver responsive to the detection of a character in said sequence of characters immediately following said first character different from said first character for providing a predetermined response thereto, (g) means for inhibiting transfer of a first character containing a permutation of signals identical to the first character utilized for control functions when in a transparent mode of operation, (h) and means responsive to a second character as indicated above for receiving the same as data.

2. The apparatus of claim 1 further including:

(a) a line register for receiving data for transfer to a receiver or from the transmitter, (b) a buffer register for receiving data from the register (a) above or transferring data thereto, (c) wherein said control circuit is responsive to data characters received in said buffer register for initiating said responses indicated above.

References Cited

UNITED STATES PATENTS

| | | | |
|---|---|---|---|
| 2,872,666 | 2/1959 | Greenhalgh | 340—174 |
| 2,897,268 | 7/1959 | Bacon. | |

PAUL J. HENON, Primary Examiner

R. F. CHAPURAN, Assistant Examiner

U.S. Cl. X.R.

178—22